United States Patent [19]

Kobayashi et al.

[11] 3,824,068
[45] July 16, 1974

[54] CLINKER COOLING APPARATUS

[75] Inventors: Hiroshi Kobayashi, Yokohama; Goro Okada, Tokyo, both of Japan

[73] Assignee: Babcock-Hitachi, Tokyo, Japan

[22] Filed: May 18, 1973

[21] Appl. No.: 361,535

[30] Foreign Application Priority Data

May 19, 1972 Japan.............................. 47-49097

[52] U.S. Cl. .................................... 432/80, 432/83
[51] Int. Cl. ............................................... F27b 7/02
[58] Field of Search ............. 432/77, 78, 80, 83, 84

[56] References Cited
UNITED STATES PATENTS

| | | | |
|---|---|---|---|
| 2,068,574 | 1/1937 | Smith | 432/78 |
| 3,276,755 | 10/1966 | Bast | 432/78 |
| 3,358,385 | 12/1967 | Maberry | 432/77 |

*Primary Examiner*—John J. Camby
*Attorney, Agent, or Firm*—Beall & Jeffery

[57] ABSTRACT

This invention provides a clinker cooling apparatus which comprises a grate type clinker cooler connected with a rotary kiln for calcining clinker, a moving bed type clinker cooler connected with said grate type clinker cooler, a breaker disposed between said two clinker coolers to break large masses of the clinker, and screening equipment disposed before and after said breaker, respectively, to separate the large masses and fine granules from the clinker. This clinker cooling apparatus preferably comprises, in addition to the foregoing members, a heat exchanger having a heat transmission surface, which is mounted in said moving bed type cooler to cool the clinker indirectly.

This clinker cooling apparatus comprising a combination of grate type and moving bed type clinker coolers gives such high cooling effect and high heat recovery efficiency as will not be attainable by single use of either of the two coolers, and this clinker cooling apparatus is further advantageous in that the exhaust gas contains no dust or hardly any dust and it has a compact size.

7 Claims, 4 Drawing Figures

CLINKER COOLING APPARATUS

BACKGROUND OF THE INVENTION

1. Field of the Invention

This invention relates to a clinker cooling apparatus with air or other gases as cooling media for cooling cement clinker, lime and the like which are calcined by a rotary kiln or the like and are in the red-hot state.

2. Description of the Prior Art

In general, a clinker which is calcined at 1,000° to 1,400° C. in a rotary kiln and is in the red-hot state, is forwarded to a clinker cooling apparatus, and while it is passing through this apparatus, it is quenched with cooling air and the temperature of clinker is ordinarily reduced to 70° to 80° C. at the outlet of this apparatus.

The clinker calcined in a rotary kiln has generally a broad size distribution range of from fine granules of a size less than 1 mm to large masses of a size exceeding 1,000 mm. Apparatuses for cooling such red-hot clinker which are commercially employed are roughly divided into the following two types.

One type is a cooling apparatus provided with a grate such as an oscillating grate in the interior thereof. In the cooling apparatus of this type, clinker is fed on the grate falling from a rotary kiln and forwarded substantially horizontally on the grate toward the outlet of the cooling apparatus. Thus, a layer of the clinker is formed on the grate and cooling air is fed from below the grate in a vertical direction perpendicular to the direction of movement of the clinker layer and penetrates through the clinker layer, to thereby perform the cross flow heat exchange (hereinafter referred to as the grate type cooler).

The other type is a cooling apparatus in which a red-hot clinker coming from a rotary kiln and falling in the cooling apparatus is made resident in the apparatus in the form of a layer, and while the layer is being moved from the upper portion to the lower portion of the cooling apparatus, cooling air is fed in a counter flow manner in a direction reverse to the direction of movement of the clinker layer, namely from the lower portion of the clinker layer to the upper portion of the clinker layer, to thereby perform the counter flow heat exchange (hereinafter referred to as the moving bed type cooler).

In the case of the grate type cooler, even when the clinker includes large masses having a size exceeding 1,000 mm, since cooling air can penetrate through the clinker layer relatively uniformly, but of course excepting such said solid mass, it is generally possible to attain a relatively uniform cooling effect regardless of the size distribution and properties of the clinker. In high temperature zone of the clinker layer (zones in the vicinity of the falling point of the cooler where the clinker coming from the rotary kiln falls), the heat exchange is effectively accomplished because there is a sufficient temperature difference between clinker particles and cooling air and the air temperature is sufficiently elevated by the heat exchange. However in the low temperature zone spaced from the falling point, since there is not a great temperature difference, the heat exchange is not effectively accomplished and hence, a great quantity of cooling air should be employed, which is the defect of the grate type cooler. In the moving bed type cooler, in case the clinker includes large masses or in case fine particles alone assemble partially and form a layer, there is brought about a considerable difference of the flow amount of cooling air between portions including large masses and portions free from large masses or between portions including concentrated fine granules and pprtions including small quantity of fine granules, and in an extreme case, passage of cooling air is inhibited by such large masses or fine granules to cause uneven cooling of the clinker, whereby a uniform cooling effect cannot be obtained. This is the defect of the moving bed type cooler.

However, in the case of the moving bed type cooler, as far as the clinker does not include large masses or fine granules, the cooling air is fed to low temperature zone of the moving bed of the clinker, namely from the lower portion of the cooler, and goes up successively forwardly toward the high temperature zone, namely the upper portion of the cooler, while retaining a sufficient temperature difference constantly, and consequently, the cooling air forms a counter flow reverse to the direction of movement of the clinker layer and attains an effective heat exchange in either the high temperature zone or the low temperature zone of the clinker layer.

In short, as compared with the grate type cooler, the moving bed type cooler gives a sufficient cooling effect with use of a very small amount of cooling air. In other words, the grate type cooler needs a greater amount of cooling air than the moving bed type cooler, if it is intended to attain the same cooling effect of clinker.

The above fact also means that in the conventional grate type cooler, the amount of the exhaust gas, which is high temperature air and accompanying dust discharged from the cooler, is larger, and that in order to prevent the environmental pollution by this dust-containing exhaust gas, it is necessary to provide a dust collector of a large size. In contrast, in the moving bed type cooler, since a small amount of cooling air is sufficient for cooling a moving bed of clinker free from large masses or fine granules and the clinker layer itself exhibits a filtering effect, the dust content in the exhaust gas can be reduced, and the environmental pollution by powder dusts can be prevented without use of a dust collector of a large size.

It is a primary object of this invention to provide a clinker cooling apparatus in which supply of such a great amount of cooling air or provision of such a large dust collector as required in the conventional grate type cooler is not needed at all.

Another object of this invention is to provide a clinker cooling apparatus in which, even when a clinker includes large masses and fine granules, a sufficient cooling effect can be attained with such a small amount of cooling air as in the conventional moving bed type cooler and the dust content in the exhaust gas can be reduced sufficiently with use of such a small dust collector as adopted in the conventional moving bed type cooler.

Still another object of this invention is to provide a clinker cooling apparatus which has merits of both the conventional grate type cooler and moving bed type cooler.

A still further object of this invention is to provide a clinker cooling apparatus which causes hardly any environmental pollution by the exhaust gas.

SUMMARY OF THE INVENTION

In accordance with this invention, there is provided a clinker cooling apparatus, in which a red-hod clinker calcined in a rotary kiln is fed at first into a grate type cooler to cool the clinker to an intermediate temperature, large masses contained in the clinker are broken by means of a breaker mounted in the outlet end of the grate type cooler, simultaneously large masses and fine granules are separated and removed from the clinker by means of screening equipment disposed before and after the breaker, respectively, and then the clinker free from large masses and fine granules is fed to a moving bed type cooler in which it is cooled to a low temperature. In a preferred embodiment of the clinker cooling apparatus of this invention, a heat exchanger having a heat transmission surface is mounted in the interior of the moving bed type cooler, whereby the clinker is indirectly cooled by air or other cooling medium, and the exhaust gas from the moving bed type cooler is transferred to grate type cooler to use as cooling air.

DETAILED DESCRIPTION OF THE INVENTION

The principle of the cooling apparatus of this invention will now be illustrated.

Figure 1:
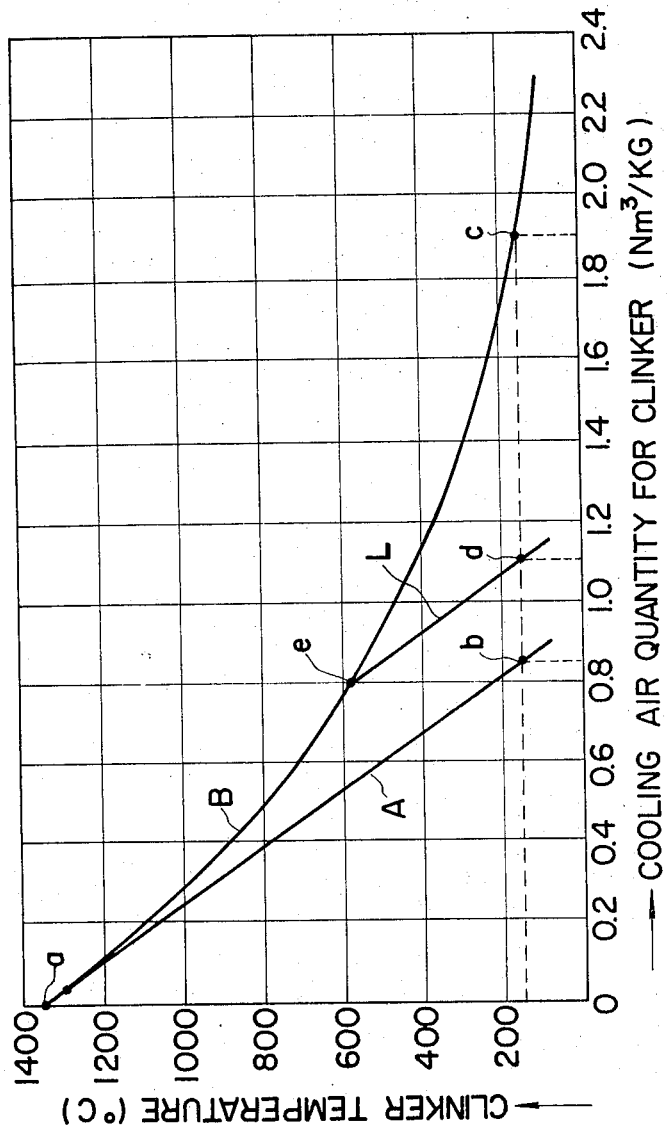
FIG. 1 illustrates curves of cooling characteristics of a conventional grate type cooler, a conventional moving bed type cooler and a cooling apparatus comprising both of these coolers in combination.

In FIG. 1, there are shown curves of cooling characteristics of a grate type cooler, a moving bed type cooler and a cooling apparatus comprising both the coolers in combination. The ordinate indicates the clinker temperature and the abscissa indicates the cooling air quantity necessary to cool the clinker to the corresponding temperature.

The curve A shows the cooling characteristics of the moving bed type cooler. For instance, the amount of cooling air necessary for cooling the clinker at point $a$ (1,370° C.) to point $b$ (150° C.) is 0.85 Nm$^3$ per Kg of clinker.

The curve B shows the cooling characteristics of the grate type cooler. For instance, cooling air must be fed in an amount of 1.9 Nm$^3$ per Kg of clinker in order to cool the clinker at point $a$ (1,370° C.) to point $c$ (150° C.).

From these curves it is seen that when the clinker temperature is sufficiently high and there is a sufficient temperature difference between the clinker and cooling air, namely in high temperature zone of the clinker layer, there is no substantial difference of the cooling effect between the moving bed type cooler and the grate type cooler. However, as the clinker is cooled, for instance, to a temperature lower than 500° C., namely in low temperature zone of the clinker layer, a sufficient temperature difference between the cooling air and clinker is difficultly attainable in the grate type cooler, with the result that the necessary amount of the cooling air differs greatly between the grate type cooler and moving bed type cooler. Thus, as described above, in order to obtain the clinker cooled to 150° C., 1.9 Nm$^3$ of cooling air is necessary for the grate type cooler, while only 0.85 Nm$^3$ of cooling air is sufficient for the moving bed type cooler.

These facts have the following meaning according to the present invention. In the high temperature zone, the moving bed type cooler can not be used because of the formation of large size clinker during calcination of clinker in the kiln. The grate type cooler is most suitable to use in such zone. If the size adjustment of clinker is made by breaker and screening after the cooling of clinker by the grate type cooler to intermediate temperature, the moving bed type cooler is most suitable to use because of its cooling efficiency. Thus, the combination of both coolers presents a clinker cooling apparatus having very high heat efficiency.

This will now be illustrated more detailedly basing on numerical values by reference to FIG. 1. A high temperature clinker in which there is such a great temperature difference between clinker particles and cooling air resulting in that the cooling can be accomplished effectively even by the grate type cooler, is cooled along the curve B to 500° to 600° C. by using the grate type cooler, and the large masses contained in the clinker on the grate are broken at point $e$ where mechanical breaking and screening operations become availably, and from $e$, when the so size-adjusted clinker is cooled by means of the moving bed type cooler, the temperature of the clinker is lowered along the curve L and the amount of cooling air necessary for cooling the clinker from the point $a$, i.e., 1,350° C., to the point $d$, i.e. 150° C., is 1.1 Nm$^3$ per Kg of clinker. That is to say, if the grate type cooler is combined with the moving bed type cooler skillfully, it will be made possible to design a cooling apparatus which can accomplish the cooling of clinker containing even large masses with use of cooling air in an amount substantially equal to the amount of cooling air used in the moving bed type cooler. However, the following three difficulties are involved in attaining such combination of the grate type cooler and moving bed type cooler.

The first difficulty resides in incorporation of large masses of clinker into the moving bed type cooler. As described above, if large masses of clinker are incorporated into the moving bed type cooler, passage of cooling air is inhibited by the presence of these large masses and hence, a sufficient cooling effect cannnot be obtained. Accordingly, such large masses of clinker should be pulverized to a diameter not exceeding about 25 mm before they are introduced into the moving bed.

The second difficulty results from incorporation of fine granules of the clinker. In case fine particles having a diameter smaller than about 1 mm are introduced into the moving bed, a resistance against air passage is locally disturbed at the zone predominantly occupied by such fine granules where a sufficient cooling effect cannot be expected. Accordingly, it is desired that such fine granules are separated and removed before the introduction of clinker into the moving bed.

The third difficulty resides in the fact that in the moving bed type cooler the temperature of the exhaust gas which has been directly heat-exchanged with the clinker is too high to dispose. As mentioned above, since a very effective heat exchange is performed in the moving bed type cooler in which the counter flow heat exchange procedure is adopted, if the clinker introduced into the moving bed type cooler is maintained at 500° to 600° C., air which has been heat-exchanged with the clinker is heated to about 500° to 600° C. Such high temperature air cannot be used directly as cooling air for the grate type cooler, though no trouble is brought about if it is used for drying the raw material or the like. More specifically, if such high temperature gas of 500° to 600° C. is directly used as cooling air for the grate type cooler, the grate of the grate type cooler is liable to be destroyed by the heat of such high temperature air after a long continuous operation of the apparatus and the drastic lowering of the cooling efficiency.

Accordingly, in such case, it is necessary to provide another heat transmission surface for cooling in the interior of the moving bed type cooler, whereby not only the clinker particles are cooled directly by cooling air but also by indirect cooling. The cooling air which has been directly heat-exchanged with the clinker is also simultaneously cooled indirectly by this heat transmission surface that is in turn cooled by additional cooling air, to thereby reduce the temperature of the exhaust gas to about 200° C.

This invention provides a clinker cooling apparatus of a compact size which can overcome the above-mentioned difficulties involved in combining the grate type cooler with the moving bed type cooler to attain a very high cooling effect even in the case of clinker having large masses and fine granules, and can attain a very high heat recovery efficiency with no dust content in the exhaust gas or a greatly reduced dust content in the exhaust gas.

More specifically, in accordance with this invention, a red-hot clinker calcined in a rotary kiln is cooled to an intermediate temperature (about 500° to about 600° C.) by means of a grate type cooler, large masses on the grate are then broken by a breaker disposed in the vicinity of the outlet of the grate type cooler, simultaneously large masses and fine granules contained in the clinker are separated and removed from the clinker by means of screening equipment disposed respectively before and after said breaker, and then the clinker from which large masses and fine granules have been removed (hereinafter referred to as "coarse clinker") is fed to a moving bed type cooler where coarse clinker is cooled to a lower temperature. In a preferred embodiment of this invention, a heat exchanger having a heat transmission surface cooled by additional cooling air or other medium is provided in the interior of said moving bed type cooler, and the exhaust gas from said moving bed type cooler is used as cooling air for said grate type cooler.

The cooling apparatus of this invention will now be illustrated more detailedly by reference to accompanying drawings.

Figure 2:
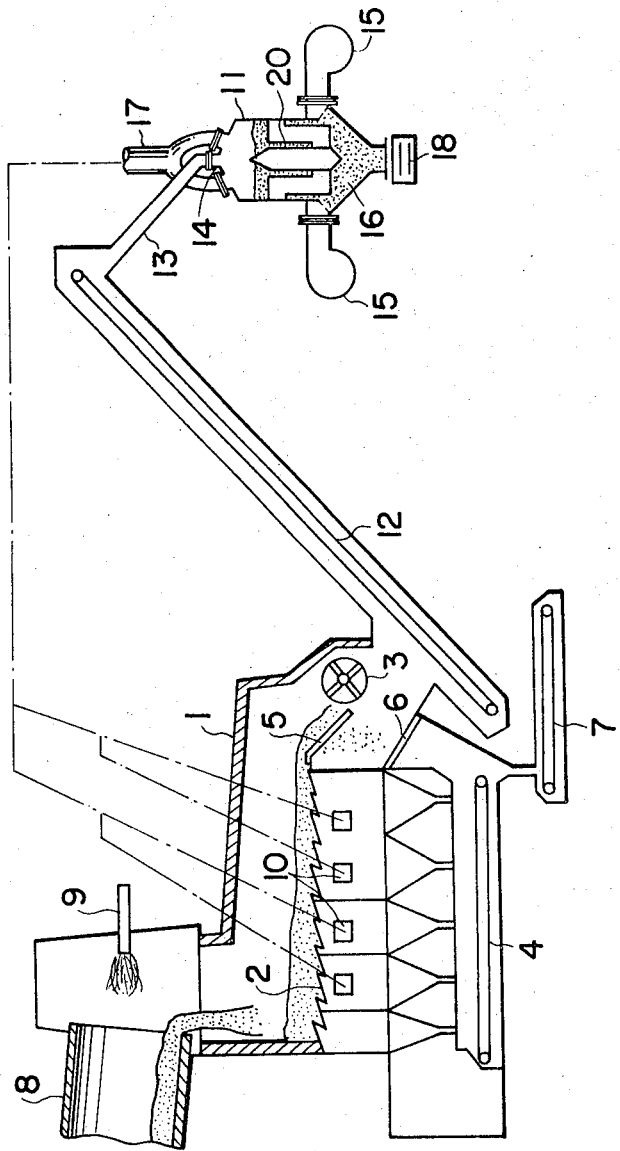
FIG. 2 is a diagram illustrating the section of the cooling apparatus of this invention.

In FIG. 2, a grate type cooler 1 has a grate 2 for forwarding clinker, and large masses in the clinker forwarded by the grate 2 are broken at the discharge end of the cooler 1 by means of a breaker 3 such as a hammer breaker. Fine granules falling from air holes of grate plates or clearances between plates while the clinker is being forwarded on the grate 2 are received on a conveyer 4 and they are forwarded to the discharge end by this conveyer 4. A first screening equipment 5 is disposed just before the breaker 3, which allows only coarse clinker from which large masses are removed and fine granules to pass therethrough. A second screening equipment 6 is disposed just after the breaker 3 below the first screening equipment 5, which allows only fine granules to pass therethrough and leaves the coarse clinker thereon. Fine clinker granules passing through the second screening equipment 6 and fine clinker granules forwarded by the conveyer 4 are received on a conveyer 7, and they are withdrawn from the cooling apparatus by means of said conveyer 7. In FIG. 2, referential numeral 8 indicates a rotary kiln having a rotary kiln burner 9, and reference numeral 10 indicates a cooling air-introducing opening of the cooler 1.

The coarse clinker cooled to an intermediate temperature by the grate type cooler 1 is forwarded to a moving bed type cooler 11 by means of a conveyer 12. The end of the conveyer 12 is connected to a clinker opening 14 of the cooler 11 by means of a chute 13. Cooling air is fed by means of a fan 15 to cool directly a moving bed 16 of the clinker in the cooler 11. Reference numerals 17 and 18 indicate an exhaust gas duct of the cooler 11 and a conveyer for forwarding the cooled clinker discharged from the cooler 11, respectively.

In the cooling apparatus of the above-mentioned structure, a red-hot clinker calcined in the rotary kiln falls on the grate 2 at one end of the grate type cooler 1 and is forwarded almost horizontally toward an outlet positioned at the other end of the cooler 1 by means of such grate as an oscillating grate or a chain grate. During this passage, the clinker is cooled by cooling air which is introduced into the cooler 1 from a cooling air inlet 10 and penetrates through an almost horizontal layer of the clinker from the lower portion toward the upper portion thereof. Thus, the heat exchange is accomplished between the clinker and cooling air in a vertical cross flow manner, and the clinker is cooled.

All of the air, the temperature of which has been elevated by heat exchange with the clinker layer on the grate 2, or a part of the air that has passed through the high temperature size of the clinker layer, is forwarded to burner 9 as secondary air of the burner 9, where by the heat held by this air is recovered. In case where only a part of the cooling air that has passed through the high temperature side of the clinker layer, that is, the rotary kiln side is forwarded to the burner 9, the other part of this cooling air has passed through the low temperature side of the clinker layer, that is, the breaker side is discharged from the cooler 1 through a dust collector mounted outside of the cooler 1.

Large masses contained in the clinker, which has been thus transported to the discharge end of the cooler 1 while being carried on the grate 2 and being cooled, are broken into granules having a size less than the maximum size coolable in the moving bed type cooler 11 (about 25 mm) by means of a breaker 3. All granules having a size less than said maximum size pass through a first screening equipment 5 and fall on a second screening equipment 6, where only coarse clinker of a size of about 5 mm over is separated by screening. Then, the coarse clinker is thrown into a receiving pit of a conveyer 12. Unbroken large masses of clinker having a size exceeding 25 mm are broken again by the breaker 3 and converted to small masses under 25 mm. Fine granules having a size less than 5 mm are allowed to fall through the meshes on numerous holes of a diameter of about 5 mm perforated through the second screening equipment 6, and then those screened granules are thrown into an inlet of a conveyer 7 together with fine granules which have been transported by a conveyer 4. Accordingly, only the coarse clinker having a size ranging from 5 to 25 mm are forwarded to the moving bed type cooler 11 through a conveyer 12, a chute 13 and a clinker inlet 14.

The clinker charged into the moving bed type cooler 11 forms a moving layer 16 and is cooled by cooling air fed from beneath the cooler 11 by means of a fan 15. Since this clinker is broken to a certain size, for instance, 5 to 25 mm, the surface area of the clinker to be cooled is great. Further, the moving layer of the clinker is shifted downwardly, while cooling air is blown upwardly, and thus there is always attained a sufficient temperature difference between the clinker layer 16 and cooling air in the interior of the cooler 11. In this way, the heat exchange is accomplished in a counter flow manner, and the clinker is cooled effectively.

If the clinker is cooled by cooling air in an amount corresponding to the amount of air necessary for accomplishing combustion in the burner 9 for the rotary kiln or in an amount approximating said amount, this amount of cooling air is fed into the moving bed type cooler 11 by means of the fan 15 and the exhaust gas from the cooler 11 is recycled to the grate type cooler 1 by means of an exhaust gas duct 17 to be used as secondary air for the burner 9, the amount of secondary air for combustion of the burner 9 is equal to the amount of air for cooling the clinker and the amount of cooling air per unit weight of the clinker is automatically decided.

In case, the so automatically decided amount of cooling air (0.7 – 0.9 $Nm^3$ per Kg of the clinker) is used for the counter flow heat exchange in the moving bed type cooler 11, when the temperature of the clinker introduced from the inlet 14 is 550° C., the exhaust gas temperature reaches 450° to 500° C. If this high temperature exhaust gas is directly introduced into the grate type cooler 1 as cooling air, the temperature is excessively elevated at each part of the grate 2 and burning destruction of the grate type cooler 1 will appear. Therefore, the above exhaust gas should be cooled to about 200° C. by some means or other.

Figure 3:
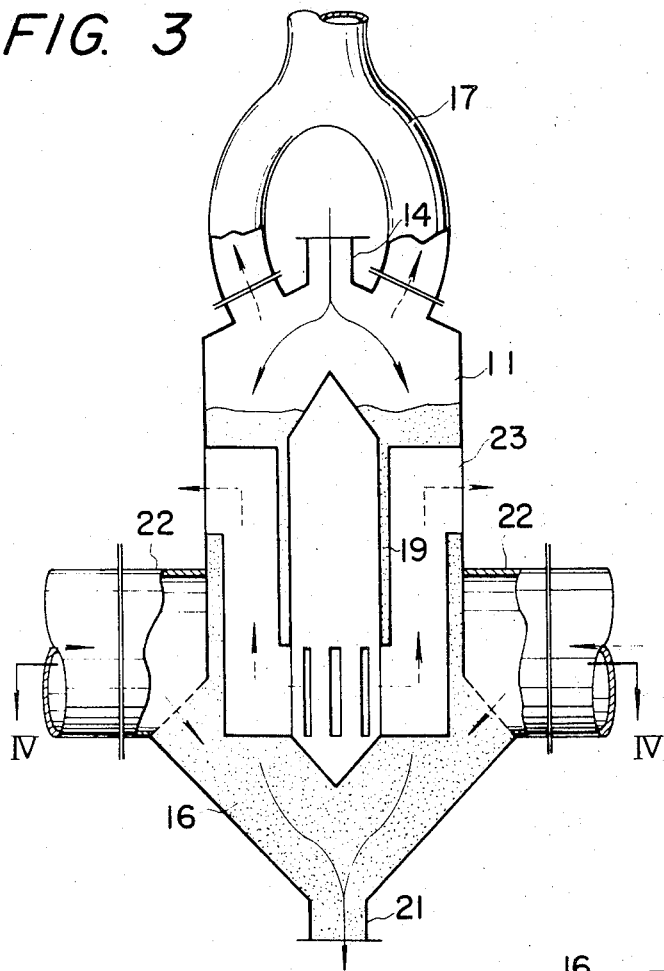
FIG. 3 is a diagram illustrating the longitudinal section of the moving bed type cooler to be used in this invention.
Figure 4:
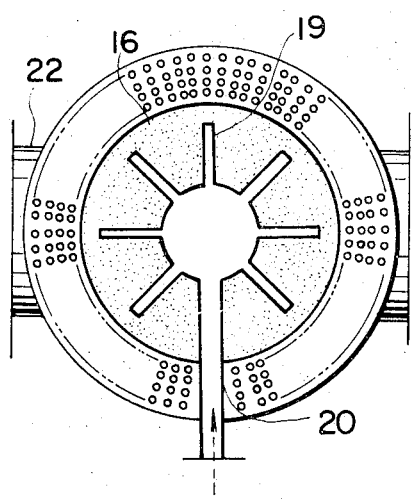
FIG. 4 is a diagram illustrating the section taken along the line IV—IV of FIG. 3.

In order to cool further the exhaust gas from the moving bed type cooler 11, it is considered to provide a heat-exchanger for cooling in the midway of the exhaust gas duct 17. In this invention, however, as illustrated detailedly in FIGS. 3 and 4, a heat-exchanger 20 having a heat transmission surface 19 is provided in the interior of the moving bed type cooler 11, whereby the clinker and cooling air conducting direct heat exchange are indirectly cooled and the cooling effect can be increased.

The coarse clinker fed from the grate type cooler 1 is charged into the moving bed type cooler 11 from the clinker inlet 14 and moves in the form of a moving layer 16 downwardly in the direction indicated by the solid line arrow in the drawings, following which the clinker is discharged from a clinker outlet 21. While the clinker is transported in this manner, the prescribed amount of air for direct cooling is introduced in the cooler 11 through an air inlet 22. The cooling air flows upwardly while directly cooling the clinker particles constituting the clinker layer 16, and then it is fed into the grate type cooler 1 through the exhaust gas duct 17 disposed in the vicinity of the clinker inlet 14.

On the other hand, cooling air introduced into the heat exchanger 20 for indirect cooling from the fan 15 through another duct (not shown) or a separately mounted fan (not shown) and flowing in the direction indicated by the dotted line arrow in the drawings, is used to cool through the heat transmission surface 19 both the clinker and air which have been directly heat-exchanged with the clinker respectively and then is discharged into the outer air through an air outlet 23.

In the above embodiment, there is illustrated a cooling heat-exchanger 20 having a heat transmission surface 19 of a radial configuration. In addition, a heat transmission surface of a concentric structure or a parallel plane structure may be employed. Not only air but also other gases or liquids such as water can be used as the cooling medium. In such case, a gas feeding fan or liquid feeding pump must be provided.

In case, the temperature of the clinker to be charged into the moving bed type cooler 11 is 550° C. and the amount of the exhaust gas from the cooler 11 is 0.85 $Nm^3$ per Kg of the clinker, in the above embodiment of this invention where a heat exchanger for indirect cooling 20 having a heat transmission surface 19 is provided in the interior of the moving bed type cooler 11, the temperature of the exhaust gas discharged from the moving bed type cooler 11 can be reduced to about 220° C. In contrast, in the case of the cooler of this type not provided with a cooling heat exchanger 20, the exhaust gas temperature is as high as about 485° C. Accordingly, in the cooling apparatus of this invention it is not necessary to provide any heat exchanger in the gas exhaust duct from the moving bed type cooler to the grate type cooler. Further, the exhaust gas from the moving bed type cooler can be directly used as cooling air for the grate type cooler. Thus, great economical advantages can be attained in this invention.

The clinker cooled in the moving bed type cooler 11 is discharged from an outlet 21 through a rotary feeder connected with the lower portion of the cooler 11, and it is forwarded to a clinker hall by means of a conveyer 18.

As detailed hereinabove, the clinker which has been heat-exchanged with cooling air in a cross flow manner in the grate type cooler 1 is fed to the hammer breaker 3 where large masses of the clinker are broken, and it is then introduced into the moving bed type cooler 11 after the clinker size has been adjusted to about 5 to 25 mm by means of the screening equipment 5 and 6 (This particle size is not particularly critical). In the moving bed type cooler 11, the clinker is heat-exchanged with cooling air in a counter flow manner. In this embodiment, as shown by curve L in FIG. 1, the amount of cooling air necessary for cooling the clinker to the point $d$ (150° C) is 1.1 $Nm^3$ per Kg of the clinker. Thus, according to this invention, the clinker can be cooled effectively with use of a small amount of cooling air.

Further, the exhaust gas from the moving bed type cooler 11 is not discharged in the outer air, and it is completely forwarded to the grate type cooler 1 and used for cooling clinker on the grate 2, following which all or a part of the exhaust gas is used as air for combustion of the burner 9. Accordingly, the heat recovery efficiency can be greatly increased and also it is not necessary to provide a particular dust collector. If provision of a dust collector is required, sufficient results can be obtained by using a dust collector of a very small size. This is another advantage of this invention.

In general, a conventional clinker cooling apparatus comprising only a grate type cooler is practically operated so that 4,500 tons of clinker is cooled per day. Since the cooling efficiency is lowered at the low temperature zone of the cooler, the above practically operated cooling apparatus is obliged to have such a large size as a width of about 5.8 m and a length of 40.0 m. Accordingly, the equipment cost becomes very high.

In contrast, the cooling apparatus of this invention having a grate type cooler mounted in the zone of high temperature clinker and a moving bed type cooler mounted in the zone of low temperature clinker exhibits such a high cooling effect as is not attainable by the single use of either of said two coolers. Further, the exhaust gas is not discharged into the outer air, or if necessary to be discharged, the amount is extremely small, with result that provision of a dust collector is not necessary, or a sufficient dust-collecting effect can be attained with use of a dust collector of a very small size. Still in addition, the heat recovery efficiency can be greatly improved and the entire apparatus can be made compact. Thus, this invention attains very great economical advantages.

What is claimed is:

1. A clinker cooling apparatus comprising: a grate type clinker cooler to be connected with a rotary kiln, said cooler having therein grate means for supporting and conveying clinker of mixed granule size from the kiln through said cooler and further having means feeding cooling air through said grate means to cool the clinker on said grate means; first screening means for receiving the clinker of mixed granule from said grate type clinker cooler and for separating and discharging masses of clinker generally smaller than a first predetermined size from those generally larger than the first predetermined size; breaker means for breaking said larger masses of clinker separated by said first screening means into smaller masses; said first screening means further separating said smaller masses broken by said breaker means; second screening means for receiving said smaller masses of clinker discharged from said first screening means and for generally separating granules of clinker finer than a second predetermined size that is substantially less than said first predetermined size from coarse granules; and a moving bed type clinker cooler for receiving and cooling the coarse granules separated by said first and second screening means, said moving bed type clinker cooler having tower means forming therein a moving bed of coarse clinker granules from said second screening means, and means for feeding cooling air through the moving bed of said coarse clinker granules in a direction reverse to the direction of movement of the moving bed to provide counter flow heat exchange.

2. The apparatus of claim 1, wherein said first screening means includes a common screen for receiving both the mixed granules from said grate type clinker cooler and the broken granules from said breaker means.

3. The apparatus of claim 1, wherein said moving bed type clinker cooler further includes heat exchange means provided within the interior of the moving bed of coarse granules and providing a heat transmission surface for cooling the coarse granule clinkers indirectly on one side and for providing a through passage for cooling fluid on the other side isolated from said coarse clinker granules.

4. The apparatus of claim 3 including means for providing the exhaust cooling air from said moving bed type clinker cooler as cooling air for said grate type clinker cooler.

5. The apparatus of claim 4, including means for collecting the exhaust cooling air from said grate type clinker cooler and providing at least a portion to the rotary kiln as combustion air.

6. The apparatus of claim 1, including means for providing the exhaust cooling air from said moving bed type clinker cooler as cooling air for said grate type clinker cooler.

7. The apparatus of claim 6, including means for collecting the exhaust cooling air from said grate type clinker cooler and providing at least a portion to the rotary kiln as combustion air.

* * * * *